United States Patent [19]

Miyamoto

[11] 4,441,435
[45] Apr. 10, 1984

[54] FLUIDIZING GAS CONTROL SYSTEM IN FLUIDIZED-BED INCINERATOR

[75] Inventor: Akira Miyamoto, Katsuta, Japan

[73] Assignee: Hitachi, Ltd., Tokyo, Japan

[21] Appl. No.: 435,275

[22] Filed: Oct. 19, 1982

[30] Foreign Application Priority Data

Oct. 21, 1981 [JP] Japan .................................. 56-167129
May 14, 1982 [JP] Japan .................................... 57-79870

[51] Int. Cl.³ .............................................. F23G 5/00
[52] U.S. Cl. ..................................... 110/245; 110/185;
110/188; 122/4 D
[58] Field of Search ................. 110/245, 185, 188;
122/4 D, 7 R; 432/15.58

[56] References Cited

U.S. PATENT DOCUMENTS

| | | | |
|---|---|---|---|
| 4,072,130 | 2/1978 | Zenz | 122/4 D |
| 4,191,115 | 3/1980 | Yang et al. | 122/4 D |
| 4,239,479 | 12/1980 | Hodgkin | 122/4 D |
| 4,267,801 | 5/1981 | Robinson | 122/4 D |
| 4,273,073 | 6/1981 | Robinson | 110/245 |
| 4,355,601 | 10/1982 | Hattiangadi | 122/7 R |

*Primary Examiner*—Henry C. Yuen
*Attorney, Agent, or Firm*—Antonelli, Terry & Wands

[57] ABSTRACT

A fluidizing gas control apparatus for a fluidized-bed incinerator, in which a variation of the pressure loss of fluidizing gas flowing through a fluidized bed formed by a fluid-forming medium is measured, while progressively increasing the flow rate of fluidizing gas supplied to the incinerator in the starting stage, to determine the optimum value of the flow rate of fluidizing gas on the basis of the measured variation of the pressure loss, and the sum of the flow rate of fluidizing air and the flow rate of recirculated gases provided by recirculation of a portion of exhaust gases is controlled to be maintained at the optimum flow rate throughout the incinerating operation of the incinerator.

7 Claims, 7 Drawing Figures

FLUIDIZING GAS CONTROL SYSTEM IN FLUIDIZED-BED INCINERATOR

BACKGROUND OF THE INVENTION

1. Field of the Invention

This invention relates to a fluidizing gas control system in a fluidized-bed incinerator, and more particularly to a system for controlling the flow of fluidizing gas supplied to a fluidized-bed incinerator in which an object to be incinerated is ignited under formation of a fluidized bed of a fluid-forming medium.

2. Description of the Prior Art

A fluidized-bed incinerator is widely utilized for the incineration of an object such as sludge to be incinerated.

It is commonly known that such a fluidized-bed incinerator includes a wind box disposed in the bottom of the body of the incinerator and having connected thereto a supply line supplying oxygen-containing fluidizing gas, for example, air, and a combustion chamber called a freeboard disposed above the wind box in a relation partitioned from the wind box by a perforated member or plate. A granular fluid-forming medium such as cement clinker whose principal component is CaO is previously contained in a suitable quantity in the combustion chamber, and fluidizing gas from the supply line is forcedly supplied into the combustion chamber through the wind box and perforated member to form a fluidized bed of the fluid-forming medium in the combustion chamber. An object to be incinerated, for example, granular cakes formed by thoroughly mixing and kneading sludge and fine powdery coal are charged into the combustion chamber from above to be fluidized together with the fluid-forming medium and then ignited by the aid of auxiliary fuel injected from burners extending into the combustion chamber. Such a fluidized-bed incinerator is generally large in size, and it is generally difficult to determine the flow rate of the fluidizing gas supplied for forming the fluidized bed. A prior art practice for determining the flow rate of fluidizing gas has comprised fabricating a reduced-scale model of an actual fluidized-bed incinerator, experimentally operating such a model to plot a characteristic curve indicative of the relation between the velocity of fluidizing gas flowing through the fluidized bed and the pressure loss across the wind box and the combustion chamber, and estimating the optimum value of the flow rate of fluidizing gas on the basis of the characteristic curve thus obtained.

However, practical application of the flow rate of fluidizing gas thus determined experimentally on the model to the actual fluidized-bed incinerator is not necessarily successful for the efficient formation of the fluidized bed, and, in addition, costs including that required for the fabrication of the experimental model are considerably large resulting in want of economy.

Further, a problem to be also considered in such a fluidized-bed incinerator is that reduction of the quantity of nitrogen oxides, $NO_x$, contained in exhaust gases produced during incineration is required from the aspect of prevention of environmental pollution. The quantity of this $NO_x$ is closely related with the concentration of residual oxygen in the exhaust gases, and, therefore, the quantity of NOx can be controlled by controlling the quantity of oxygen in the fluidizing gas which is the source of oxygen required for combustion. However, because of the fact that the optimum value of the flow rate of supplied fluidizing gas is primarily determined on the basis of the efficiency of formation of the fluidized bed as described above, it becomes necessary to control the quantity of oxygen while maintaining the optimum value of the flow rate of fluidizing gas.

SUMMARY OF THE INVENTION

It is a first object of the present invention to provide a method and apparatus capable of easily determining the flow rate of fluidizing gas which is optimum for the fluidization of a fluid-forming medium in a fluidized-bed incinerator.

A second object of the present invention is to provide an apparatus for controlling the flow rate of fluidizing gas supplied to a fluidized-bed incinerator, which can control the quantity of oxygen supplied by the fluidizing gas, while maintaining the flow rate of fluidizing gas at the value optimum for the fluidization, thereby attaining the desired reduction of the quantity of $NO_x$ contained in exhaust gases.

According to the present invention, a variation in the pressure loss of fluidizing gas due to its flow through a fluid-forming medium is measured, while progressively increasing the flow rate of fluidizing gas supplied to a fluidized-bed incinerator, so as to determine the optimum flow rate of the fluidizing gas on the basis of the measured variation of the pressure loss, and the flow rate of the supplied fluidizing gas is so controlled as to be maintained at the determined value during the incinerating operation of the incinerator.

According to another aspect of the present invention, a mixture of external air and a recirculated portion of exhaust gases from the incinerator is used as the fluidizing gas for the purpose of reducing the quantity of $NO_x$ contained in the exhaust gases, and the ratio between the flow rate of air and that of the recirculated portion of the exhaust gases is controlled on the basis of the concentration of residual oxygen in the exhaust gases, while maintaining the flow rate of the gas mixture at the optimum value above described.

DESCRIPTION OF THE PREFERRED EMBODIMENTS

Figure 1:
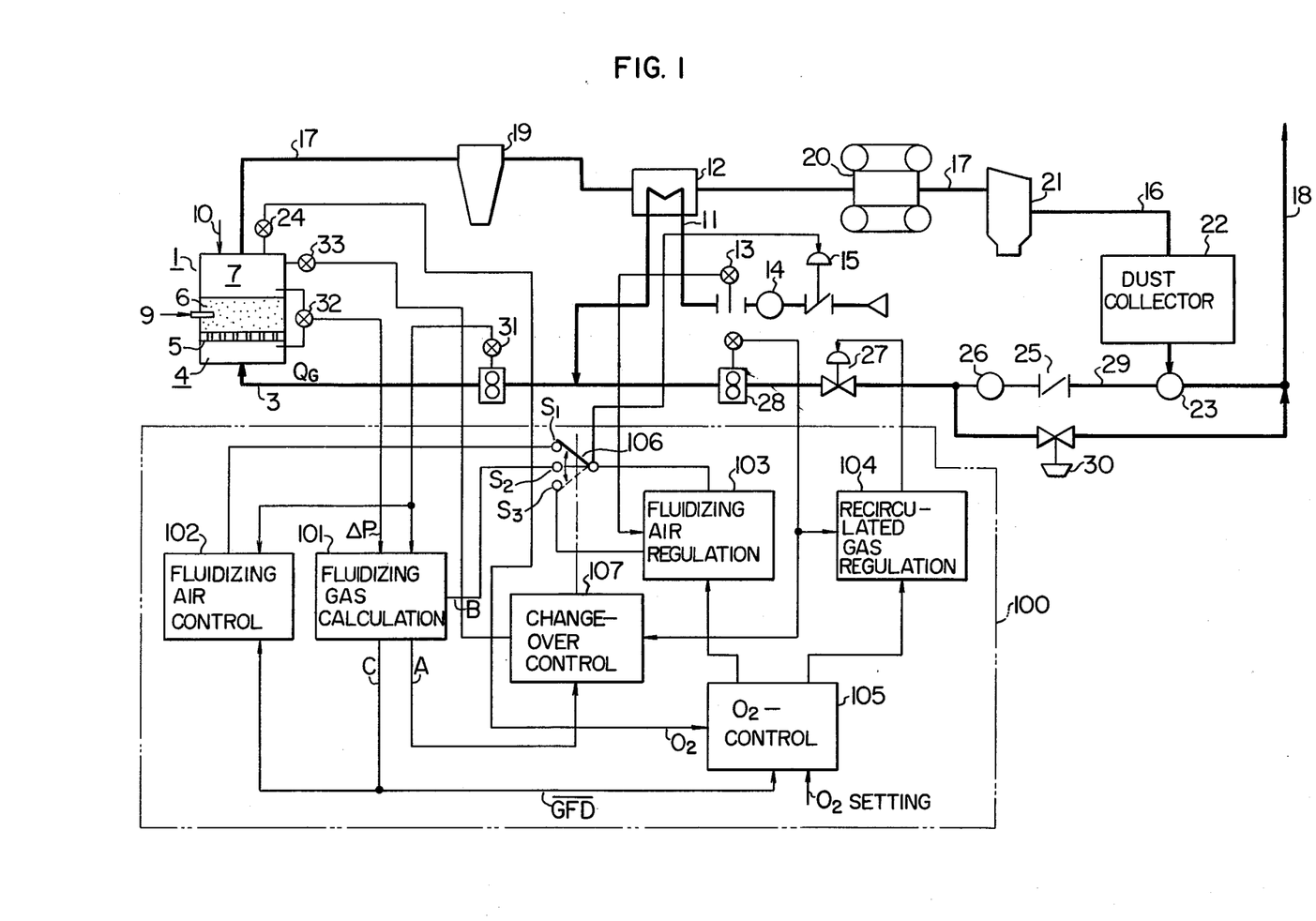
FIG. 1 is a block diagram showing an embodiment of the present invention.

Referring to FIG. 1, a fluidized-bed incinerator generally designated by the reference numeral 1 includes a wind box 4 disposed in the bottom of the body 2 of the incinerator and having connected thereto a supply line 3 supplying oxygen-containing fluidizing gas whose flow rate is $Q_G$. A combustion chamber 7 called a freeboard is disposed above the wind box 4 in a relation partitioned from the wind box 4 by a perforated member 5. A fluidized bed 6 of a granular fluid-forming medium such as cement clinker whose principal component is CaO is formed in the combustion chamber 7 by the fluidizing gas supplied under pressure into the combustion chamber 7 from the wind box 4 through the perforated member 5. Auxiliary fuel 9 is injected into the fluidized bed 6 by burners 8. An object to be incinerated, such as, a mixture of dehydrated sludge and fine powdery coal thoroughly mixed and kneaded together into cake form is charged into the combustion chamber 7 from a charge opening 10 provided at the upper part of the combustion chamber 7 to be fluidized and ignited together with the fluid-forming medium.

Figure 2:
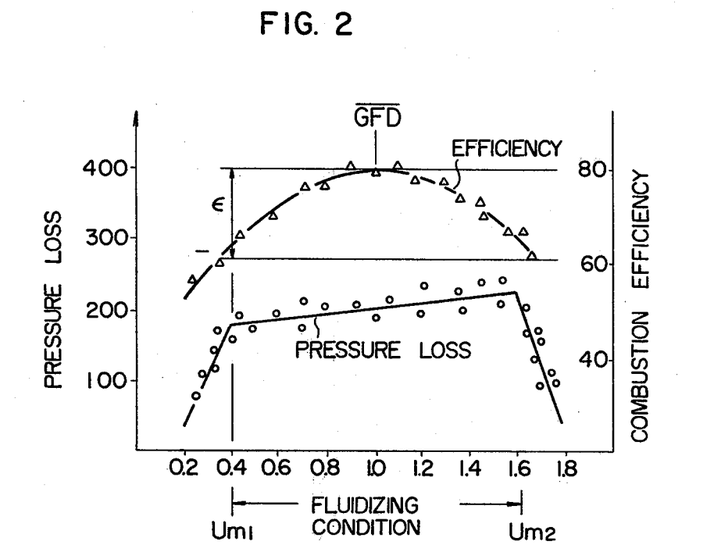
FIG. 2 is a diagram showing the pressure loss across the fluidized bed and the combustion efficiency relative to the velocity of fluidizing gas in a fluidized-bed incinerator as shown in FIG. 1.

For the fluidization of the fluid-forming medium, it is necessary to suitably select the flow rate $Q_G$ of fluidizing gas supplied by the supply line 3. FIG. 2 shows the pressure loss $\Delta P$ [mmAq] and the combustion efficiency [%] relative to the velocity $U_m$ [m/s] of supplied fluidizing gas. It will be seen in FIG. 2 that, although the pressure loss $\Delta P$ increases initially sharply with the increase in the fluidizing gas velocity $U_m$, the pressure loss $\Delta P$ varies gently when the velocity $U_m$ attains a level $U_{m1}$, and the value of $\Delta P$ becomes generally constant. Then, when another level $U_{m2}$ is exceeded with further increase in the velocity $U_m$, the pressure loss $\Delta P$ decreases sharply. The range in which the value of $\Delta P$ is maintained generally constant indicates that the fluid-forming medium is forming the fluidized bed, and, therefore, the flow rate $Q_G$ of fluidizing gas must be so selected that the value of the fluidizing gas velocity $U_m$ lies within this range. The symbol $U_{m1}$ designates the velocity at which the fluidization is started. It will be noted that the combustion efficiency is also affected by the fluidizing gas velocity $U_m$, and the point of maximum combustion efficiency lies between $U_{m1}$ and $U_{m2}$. At this point of maximum combustion efficiency, the fluidizing gas velocity $U_m$ is substantially two times as high as the fluidization starting velocity $U_{m1}$. The flow rate $Q_G$ of fluidizing gas corresponding to this fluidizing gas velocity $U_m$ is selected to be the setting of the flow rate of fluidizing gas GFD.

Description will be next directed to the control of the concentration of oxygen contained in the fluidizing gas for the purpose of reducing the concentration of $NO_X$ contained in exhaust gases. This control will be referred to hereinafter as $O_2$-control.

As described already, compounds of nitrogen contained in sludge react with oxygen in the incinerator to produce $NO_X$ (nitron oxides) which provides the source of environmental pollution, and it is therefore required to reduce the quantity of $NO_X$ in exhaust gases. Two mechanisms of production of $NO_X$ will now be clarified. According to the first mechanism, nitrogen oxide (fuel-$NO_X$) attributable to reaction with fuel is produced by reaction of nitrogen compounds contained in the sludge with oxygen existing in the fluidized bed. Its chemical formula is as follows:

$$N_2 + \tfrac{1}{2} O_2 \rightarrow NO$$

According to the second mechanism, nitrogen oxide (thermal-$NO_X$) attributable to thermal reaction is produced by reaction of nitrogen contained in air with oxygen under high temperatures. Its chemical formula is as follows:

$$N_2 + O_2 \rightarrow 2NO$$

Figure 3:
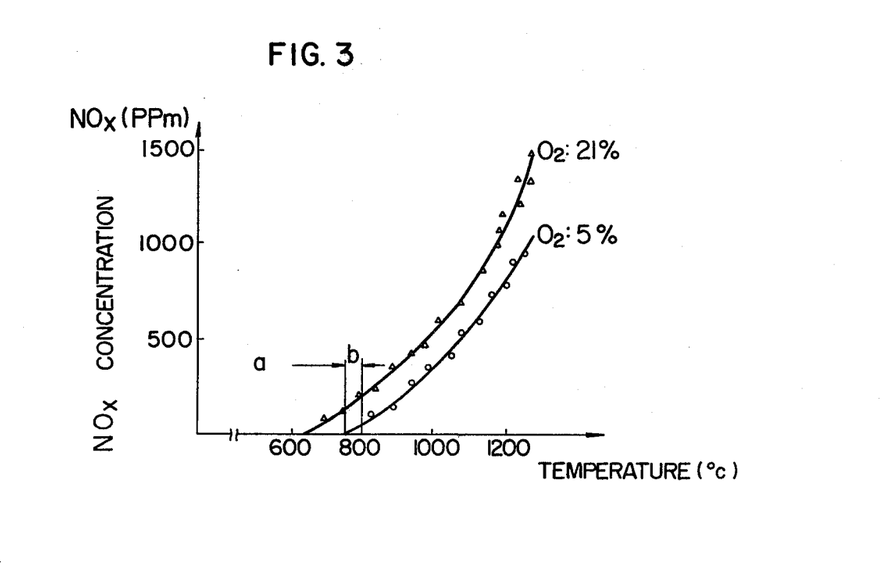
FIG. 3 is a diagram showing the concentration of NOx in exhaust gases relative to the internal temperature of the incinerator and the concentration of oxygen in the incinerator.
Figure 4:
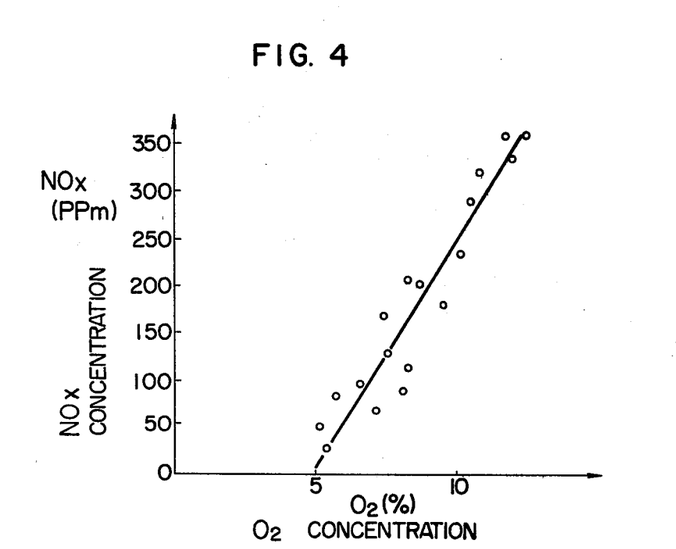
FIG. 4 is a diagram showing the relation between the concentration of oxygen and that of $NO_x$ in exhaust gases.

The concentration of $NO_X$ produced by the above mechanisms is closely related to the concentration of oxygen [%] existing in the incinerator and also to the internal temperature of the incinerator. It will be seen in FIG. 3 that the concentration of $NO_X$ increases with the increase in the temperature and increases also with the increase in the concentration of oxygen. FIG. 4 shows the concentration of $NO_X$ relative to the concentration of oxygen existing in the incinerator. The horizontal axis in FIG. 4 represents the concentration [%] of $O_2$, and the vertical axis represents the concentration [ppm] of $NO_X$. Sludge is incinerated generally at temperatures of 780° C. to 800° C. At such a temperature, the proportion of thermal-$NO_X$ is relatively small, and the greater proportion is occupied by fuel-$NO_X$. Therefore, in order to reduce the concentration of $NO_X$, it is necessary to maintain a reducing atmosphere in the incinerator, that is, to maintain a low oxygen concentration in the incinerator. The concentration of $NO_X$ produced by oxidation can be reduced to a minimum when the oxygen concentration in the incinerator is about 5% as seen in FIGS. 3 and 4.

It will be seen from the above discussion that production of $NO_X$ can be minimized when the oxygen concentration in the incinerator, hence, the residual oxygen concentration at the outlet of the incinerator is controlled to be about 5%.

If the only matter to be considered is the control of the residual oxygen concentration in the exhaust gases, this will be easily achieved by merely controlling the flow rate of fluidizing gas supplied to the incinerator. However, variations of the combustion load (for example, a variation of the water content in the sludge, a variation of the flow rate of oil supplied to the combustion sustaining burners due to a drop of the internal temperature of the incinerator, and a variation of the content of fine powdery coal in the cake) result in a corresponding variation of the theoretically required quantity of oxygen, hence, in a variation of the required flow rate of fluidizing gas. Therefore, such variations are undesirable in that the flow rate $Q_G$ of fluidizing gas deviates from its optimum value. To avoid such a situation, the present invention employs, as the fluidizing gas, a mixture of external air (which will be referred to hereinafter as fluidizing air FDB) and recirculated gases (which will be referred to hereinafter as GRB) obtained by recirculating a portion of exhaust gases. The oxygen content [%] of FDB differs from the oxygen content [%] of GRB. Therefore, the residual oxygen concentration in the exhaust gases can be controlled when the sum of the flow rates of FDB and GRB is controlled to be equal to the aforementioned setting of the flow rate of fluidizing gas GFD, and the ratio therebetween is controlled to control the quantity $Q_{O2}$ of supplied oxygen. The above relations are expressed by the following equations:

$$FDB + GRB = GFD \tag{1}$$

$$Q_{O2} = FDB \times \mu_1 + GRB \times \mu_2 \tag{2}$$

where
$\mu_1$: oxygen content of FDB = 21%

$\mu_2$: oxygen content of GRB $\approx 8\%$

The equation (1) provides the optimum value of the flow rate of GFD, and the equation (2) provides the quantity $Q_{O2}$ [Nm$^3 \times$h] of oxygen contained in the fluidizing gas which is supplied into the incinerator and is therefore important for the control of the residual oxygen concentration in the exhaust gases.

The concentration $O_2$ of excess or residual oxygen at the outlet of the incinerator is given by the following equation:

$$O_2 = \frac{Q_{O2} - \text{(theoretical } O_2 \text{ load)}}{(Q_{LG} + GFD + \text{leakage})(1 - \overline{MOS})} \quad (3)$$

where $Q_{LG}$ quantity of gases produced from sludge, fine powdery coal and combustion sustaining oil leakage: quantity of air leaking into the incinerator MOS: water content in gases theoretical $O_2$ load: theoretical quantity of oxygen required for complete combustion of sludge, fine powdery coal and combustion sustaining oil It can be understood from the equation (3) that the factor which can control the quantity of excess or residual oxygen is the quantity $Q_{O2}$ of oxygen contained in the fluidizing gas. It is to be noted in this connection that the flow rate of fluidizing gas GFD in the denominator of the equation (3) is controlled to be ways set at its optimum setting $\overline{GFD}$ as described already.

The equation (1) is transformed into the following expression:

$$\frac{FDB}{GFD} + \frac{GRB}{GFD} = 1 \quad (4)$$

This equation (4) is expressed as follows:

$$\frac{\overline{FDB}}{\overline{GFD}} + \frac{\overline{GRB}}{\overline{GFD}} = 1 \quad (5)$$

where $\overline{FDB}$ is the setting of the flow rate $Q_A$ of fluidizing gas FDB, and $\overline{GRB}$ is the setting of the flow rate $Q_R$ of recirculated gases GRB. When the term $\overline{FDB}/\overline{GFD}$ in the equation (5) is expressed as $\overline{FDB}/\overline{GFD} = K$, the relation $\overline{GRB}/\overline{GFD} = (1-K)$ is obtained. The symbol K represents the proportion of the fluidizing air FDB in the fluidizing gas GFD and has a value of $0 \leq K \leq 1$.

Transformation of the equation (2) provides the following equation:

$$\frac{\overline{FDB}}{\overline{GFD}} \times \mu_1 + \frac{\overline{GRB}}{\overline{GFD}} \times \mu_2 = \frac{Q_{O2}}{\overline{GFD}} \quad (6)$$

Substitution of $K = \overline{FDB}/\overline{GFD}$ and $(1-K) = \overline{GRB}/\overline{GFD}$ in the equation (6) provides the following equation:

$$K \cdot \mu_1 + (1-K)\mu_2 = Q_{O2}/\overline{GFD}$$

$$\therefore K(\mu_1 - \mu_2) + \mu_2 = Q_{O2}/\overline{GFD} \quad (7)$$

Suppose that $\mu_1$, $\mu_2$ and $\overline{GFD}$ in equation (7) are constant. Then, $Q_{O2}$ can be controlled by controlling the proportion K of the fluidizing air in the fluidizing gas. Partial differential of the equation (7) for the oxygen concentration $O_2$ provides the following equation:

$$\frac{\partial Q_{O2}}{\partial O_2} = \overline{GFD} \cdot (\mu_1 - \mu_2) \frac{\partial K}{\partial O_2} \quad (8)$$

Thus, the equation (8) teaches that the oxygen concentration gain of $Q_{O2}$ is given by $(\mu_1 - \mu_2)\partial K/\partial O_2$.

It will be apparent from the above discussion that, for the purpose of control of the residual oxygen concentration in exhaust gases, the fluidizing air proportion K should be varied by an oxygen concentration regulator, and, on the basis of the calculated value of the fluidizing air proportion K, the flow rates of fluidizing air and recirculated gases to be supplied to the individual loops should be set at $\overline{FDB} = K \cdot \overline{GFD}$ and $\overline{GRB} = (1-K) \cdot \overline{GFD}$ respectively.

The fluidizing gas control according to the principle above described is done in a manner as will be described presently in the embodiment of the present invention shown in FIG. 1. In FIG. 1, gas supply and exhaust systems are indicated by thick solid lines, and electrical circuits are indicated by thin solid lines. The apparatus shown in FIG. 1 includes fluidizing air supplying means and exhaust gas recirculating means for supplying fluidizing gas to the fluidized-bed incinerator.

The fluidizing air supplying means includes a fluidizing air line 11 connected to the supply line 3 supplying fluidizing gas of flow rate $Q_G$. An air preheater 12 preheating fluidizing air, a fluidizing air flow meter 13 sensing the flow rate $Q_A$ of fluidizing air FDB, a forced feed blower 14 forcedly feeding fluidizing air FDB to the fluidizing air line 11, and a fluidizing air regulating valve 15 regulating the flow rate $Q_A$ of fluidizing air FDB, are disposed on the fluidizing air line 11.

A discharge line 17 discharging exhaust gases 16 from the fluidized-bed incinerator 1 is connected to a funnel 18. A cyclone 19 removing dust and other foreign matters contained in the exhaust gases 16, the air preheater 12 preheating the fluidizing air, a waste heat boiler 20 utilizing the waste heat of the exhaust gases 16, a multiclone 21 removing finer dust, an electrical dust collector 22 removing very fine dust, and a suction fan 23 sucking the exhaust gases 16, are disposed on the discharge line 17.

The exhaust gas recirculating means provided in the fluidized-bed incinerator 1 acts to recirculate a portion of the exhaust gases 16 from the incinerator 1 to the supply line 3 supplying the fluidizing gas GFD of flow rate $Q_G$. This exhaust gas recirculating means includes an oxygen concentration sensor 24 disposed at the outlet of the incinerator 1 to sense the concentration of residual oxygen contained in the exhaust gases 16. On the basis of the sensed residual oxygen concentration, the flow rates $Q_A$ and $Q_R$ of fluidizing air FDB and recirculated gases GRB respectively are regulated so that the air-fuel ratio of air and fuel ignited in the combustion chamber or freeboard 7 can be set at a proper air-fuel ratio in which the proportion of the concentration of oxygen is, for example, about 5% as described already. The exhaust gas recirculating means includes a recirculating line 29 provided with a damper 25 regulating the flow of the recirculated gases GRB, a recirculating blower 26 recirculating a portion of the exhaust gases 16, a recirculated gas regulating valve 27 regulating the flow rate $Q_R$ of the recirculated gases GRB, and a recirculated gas flow meter 28 metering or sensing the flow rate $Q_R$ of the recirculated gases GRB. The recirculating line 29 is connected between the suction fan 23 and the fluidizing gas supply line 3. The recirculating blower 26 is also connected at its discharge side to the funnel 18 through a regulating valve 30.

A fluidizing gas flow meter 31 metering or sensing the flow rate $Q_{GF}$ of fluidizing gas GFD is provided on the supply line 3. The flow rate $Q_{GF}$ of fluidizing gas GFD sensed by this fluidizing gas flow meter 31 is the sum of the flow rate $Q_A$ of the fluidizing air FDB sensed by the fluidizing air flow meter 13 and the flow rate $Q_R$ of the recirculated gases GRB sensed by the recirculated gas flow meter 28.

The fluidized bed incinerator 1 is further provided with a differential pressure sensor 32 sensing the differential pressure across the fluidized bed 6, that is, the pressure difference between the wind box 4 and the freeboard 7, and a temperature sensor 33 sensing the temperature of exhaust gases discharged during the operation of the incinerator 1. The individual output signals from these sensors 32 and 33 are applied to a control circuit 100 which controls the flow of the fluidizing gas to the fluidized-bed incinerator 1. The individual output signals from the fluidizing gas flow meter 31, recirculated gas flow meter 28, fluidizing air flow meter 13 and oxygen concentration sensor 24 are also applied to the control circuit 100.

This control circuit 100 functions to detect the fluidization starting gas velocity $U_{m1}$ by progressively increasing the flow rate $Q_A$ of fluidizing air FDB, while the differential pressure $\Delta P$ across the fluidized bed 6 in the incinerator body 2 is sensed by the differential pressure sensor 32 in the combustion starting stage. In this stage, the internal temperature of the incinerator 1 is progressively raised by burning fuel 9 on the basis of the sensed differential pressure $\Delta P$. Then, when the fluidizing air flow meter 13 measures the flow rate $Q_A$ of fluidizing air FDB at the sensed time of the fluidizing gas velocity $U_{m1}$, the control circuit 100 calculates such a setting of the flow rate $Q_G$ of fluidizing gas GFD that the setting includes a margin enough to set the flow rate $Q_G$ at, for example, about two times as large as the actually measured value of the flow rate $Q_A$ of fluidizing air FDB. The calculated value is stored in the control circuit 100 as the setting $\overline{GFD}$ of the fluidizing gas flow rate optimum for the formation of the fluidized bed 6, and this stored setting $\overline{GFD}$ of the flow rate $Q_G$ of fluidizing gas GFD is based to provide the desired flow of fluidizing gas to be supplied to the incinerator 1 during incineration of sludge under the $O_2$-control. Further, in order to deal with possible failure of the exhaust gas recirculating blower 26 during execution of the $O_2$-control, the control circuit 100 is constructed so that the desired control of maintaining the flow rate $Q_A$ of fluidizing air FDB at about the calculated setting (the desired value) $\overline{GFD}$ of the fluidizing gas flow rate can be executed by the function of the fluidizing air blower 14 alone.

The control circuit 100 includes a fluidizing gas flow rate calculating circuit 101, a fluidizing air flow rate control circuit 102, an $O_2$-control circuit 105 and a change-over control circuit 107. The output signals from the differential pressure sensor 32 and fluidizing gas flow meter 31 indicative of the respective values of the differential pressure $\Delta P$ and fluidizing gas flow rate $Q_{GF}$ sensed in the combustion starting stage of the incinerator 1 are applied to the fluidizing gas flow rate calculating circuit 101, and, on the basis of these sensed values, the circuit 101 calculates and stores the setting $\overline{GFD}$ of the flow rate of fluidizing gas GFD. The output signal from the circuit 101 indicative of the fluidizing gas flow rate setting $\overline{GFD}$ and the output signal from the fluidizing gas flow meter 31 indicative of the measured flow rate $Q_{GF}$ are applied to the fluidizing air flow rate control circuit 102 which generates a control signal controlling the opening of the fluidizing air regulating valve 15 so as to set the flow rate of $Q_G$ of fluidizing gas GFD at the calculated setting $\overline{GFD}$. The output signal from the circuit 101 indicative of the fluidizing gas flow rate setting $\overline{GFD}$ and the output signal from the oxygen concentration sensor 24 indicative of the sensed oxygen concentration are applied to the $O_2$-control circuit 105 which controls a fluidizing air regulator 103 and a recirculated gas regulator 104. The output signal from the circuit 101, the output signal from the temperature sensor 33 sensing the temperature of exhaust gases at the outlet of the incinerator 1 and the output signal from the recirculated gas flow meter 28 are applied to the change-over control circuit 107 which controls a change-over switch 106 changing over the control mode depending on the operating condition of the incinerator 1.

Figure 5:
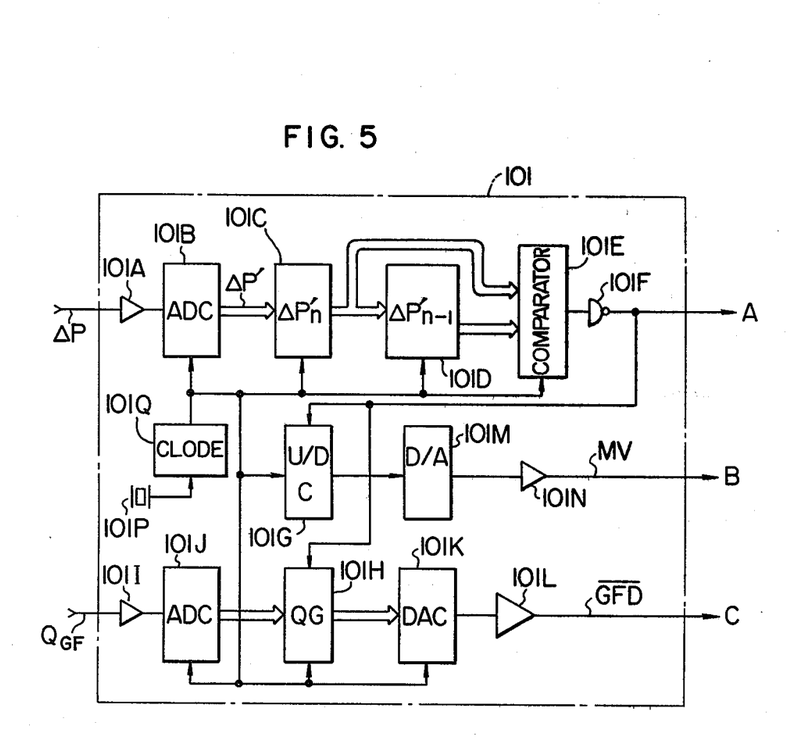
FIG. 5 is a block diagram of the fluidizing-gas flow rate calculating circuit shown in FIG. 1.

FIG. 5 is a block diagram showing in detail the structure of the fluidizing gas flow rate calculating circuit 101 in the control circuit 100.

This circuit 101 operates in the combustion starting stage of the incinerator 1. In such a stage, the recirculated gas supply system is inactive, and the fluidizing air supply system only is active. Further, in this stage, the burners 8 inject fuel 9 into the combustion chamber or freeboard 7 to progressively raise the internal temperature of the incinerator 1. At this time, the change-over switch 106 is connected at its contact $S_2$.

Referring to FIG. 5, the signal indicative of the sensed differential pressure $\Delta P$ is applied from the differential pressure sensor 32 to be amplified by an amplifier 101A. An analog-digital converter (ADC) 101B samples the amplified signal $\Delta P$ with predetermined sampling timing to convert it into a digital differential pressure signal $\Delta P'$ which is registered in a first register 101C. With the timing of sampling of the signal indicative of the next data of $\Delta P$ by the ADC 101B, the digital data $\Delta P'$ registered in the first register 101C is transferred to a second register 101D, and a newly sampled differential pressure data $\Delta P'_n$ is now registered in the first register 101C. Therefore, the previous differential pressure data $\Delta P'_{n-1}$ is registered in the second register 101D. The output signals from the first and second registers 101C and 101D are applied to a comparator 101E, so that the present differential pressure data $\Delta P'_n$ is compared with the previous differential pressure data $\Delta P'_{n-1}$ in the comparator 101E. When the difference therebetween is less than or equal to a predetermined value $\Delta P_f$, an output signal of logical level "1" appears from an output gate 101F to stop the operation of an up-down counter 101G. This counter 101G is initially set at "0" and counts clock pulses generated from a clock pulse generator 101Q. The count of the counter 101G is converted into an analog signal by a D/A converter 101M, and this analog signal is amplified by an amplifier 101N to appear at a terminal B as a signal $M_V$ which controls the opening of the fluidizing air regulating valve 15. Therefore, the flow rate $Q_A$ of fluidizing air FDB increases progressively while the counter 101G is in operation. The comparator 101E is so set that it generates an output signal of level "1" as soon as the flow rate $Q_A$ of fluidizing air FDB attains a value corresponding to $U_{m1}$ shown in FIG. 2.

The output signal indicative of $Q_{GF}$ from the fluidizing gas flow meter 31 disposed on the supply line 3 is applied through an amplifier 101I to an ADC 101J which samples the signal indicative of $Q_{GF}$ with predetermined sampling timing to convert it into a digital flow rate signal indicative of $\overline{Q_G}$ which is applied to a fluidizing gas flow rate register 101H. As soon as the counter 101G ceases its counting operation, the fluidizing gas flow rate register 101H ceases also its registering mode, and the data registered at that time is held in the register 101H. The data held in the register 101H is converted by a digital-analog converter (DAC) 101K into an analog signal which is amplified by an amplifier 101L to appear at another terminal C as a signal indicative of the setting $\overline{GFD}$ of the flow rate $Q_G$ of fluidizing gas GFD. The clock pulse generator 101Q divides the frequency of the output from an oscillator 101P to provide the clock pulses controlling the operating timing of the circuits 101B, 101C, 101D, 101E, 101G, 101J, 101H and 101K.

The output signal of level "1" from the output gate 101F appears also at another terminal A to be applied to the $O_2$-control circuit 105 and to the change-over control circuit 107. The latter circuit 107 acts to change over the contact $S_2$ of the change-over switch 106 to another contact $S_3$ in the presence of the signal of level "1" at the terminal A, when the temperature signal applied from the temperature sensor 33 indicates that the internal temperature of the incinerator 1 has exceeded a predetermined level of, for example, 850° C. The circuit 107 acts also to place the $O_2$-control circuit 105 in operation. Therefore, the fluidizing air regulating valve 15 is now controlled by the fluidizing air regulator 103 which is controlled by the $O_2$-control circuit 105. Further, at this time, the sludge charge opening 10 is automatically or manually opened, and incineration of sludge is started.

Figure 6:
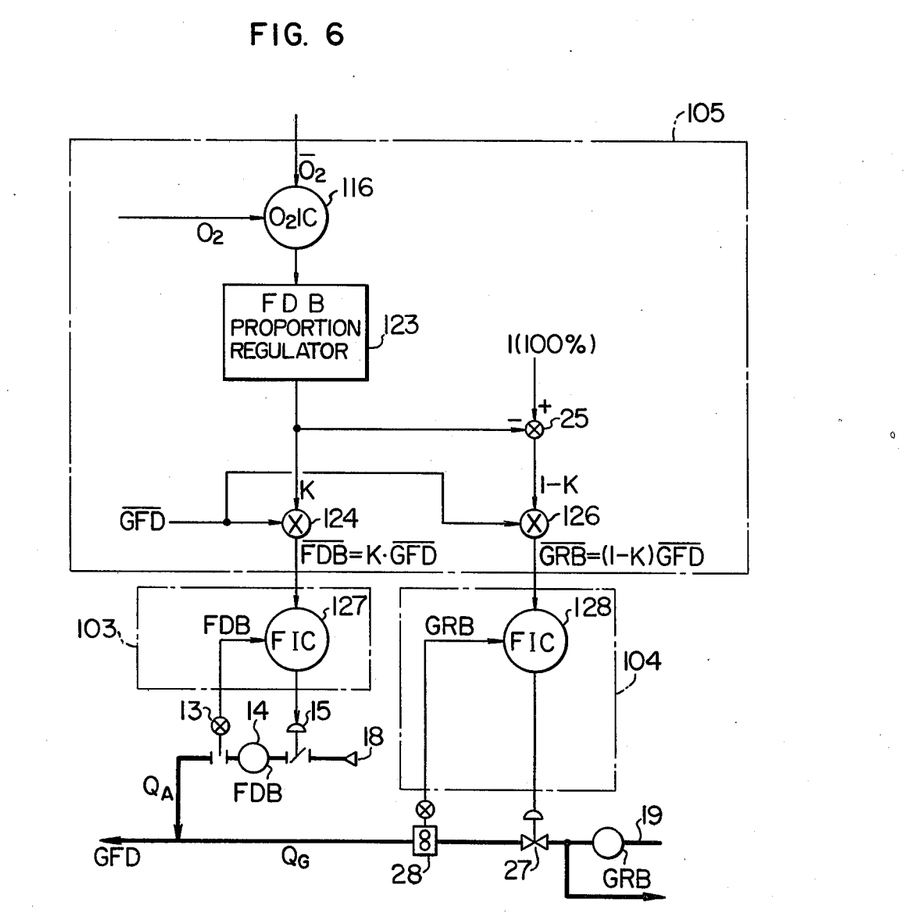
FIG. 6 is a block diagram of the oxygen concentration control circuit shown in FIG. 1.

The structure of the $O_2$-control circuit 105, fluidizing air regulator 103 and recirculated gas regulator 104 will be described with reference to FIG. 6. Referring to FIG. 6, the $O_2$-control circuit 105 includes an oxygen concentration regulator ($O_2IC$) 116, an FDB proportion regulator 123, a first multiplier 124, a subtractor 125 and a second multiplier 126. The signal indicative of the oxygen concentration setting $\overline{O_2}$ and the output signal from the oxygen concentration sensor 24 indicative of the oxygen concentration $O_2$ of exhaust gases at the outlet of the incinerator 1 are applied to the oxygen concentration regulator 116. The FDB proportion regulator 123 regulates the fluidizing air proportion K on the basis of the output signal from the oxygen concentration regulator 116. The output signal indicative of the fluidizing air proportion K from the FDB proportion regulator 123 is applied to the first multiplier 124 to be multiplied by the output signal from the calculating circuit 101 indicative of the optimum value of the setting $\overline{GFD}$ of the flow rate of fluidizing gas. The output signal from the FDB proportion regulator 123 is also applied to the subtractor 125 which calculates the value $(1-K)$. The output signal indicative of $(1-K)$ from the subtractor 125 is applied to the second multiplier 126 to be multiplied by the signal indicative of the optimum value of the setting $\overline{GFD}$ of the flow rate of fluidizing gas.

The fluidizing air regulator 103 includes an FDB flow rate regulator (FIC) 127 which controls the fluidizing air regulating valve 15 on the basis of the difference between the output signal indicative of $K \cdot \overline{GFD}$ applied from the first multiplier 124 and the feedback signal indicative of the flow rate of fluidizing air FDB applied from the fluidizing air flow meter 13, thereby functioning to maintain the flow rate $Q_A$ of fluidizing air FDB at the value given by $K \cdot \overline{GFD}$. The recirculated gas regulator 104 includes a GRB flow rate regulator (FIC) 128 which controls the recirculated gas regulating valve 27 on the basis of the difference between the output signal indicative of $(1-K) \cdot \overline{GFD}$ from the second multiplier 126 and the feedback signal indicative of the flow rate of GRB from the recirculated gas flow meter 28, thereby functioning to maintain the flow rate $Q_R$ of recirculated gases GRB at the value given by $(1-K) \cdot \overline{GFD}$.

In the arrangement shown in FIG. 6, the oxygen concentration regulator 116 is set to provide $\overline{O_2}=5\%$. By making the PID (proportional plus integral plus derivative) calculation on the error between the setting $\overline{O_2}$ and the actually sensed oxygen concentration $O_2$ at the outlet of the incinerator 1, the signal indicative of the resultant value is applied from the oxygen concentration regulator 116 to the FDB proportion regulator 123 so that the fluidizing air proportion K is regulated to correspond to the result of calculation by the regulator 116. The signal indicative of the regulated fluidizing air proportion K from the regulator 123 is multiplied in the first multiplier 124 by the signal indicative of the optimum value of the setting $\overline{GFD}$ of the flow rate $Q_G$ of fluidizing gas GFD to calculate the setting $\overline{FDB}=K \cdot \overline{GFD}$ of the flow rate $Q_A$ of fluidizing air FDB. The signal indicative of $K \cdot \overline{GFD}$ thus calculated in the multiplier 124 is applied to the FDB flow rate regulator 127 as being indicative of the setting for the loop supplying the fluidizing air.

On the other hand, the subtractor 125 calculates the value $(1-K)$ which is used for varying the setting $\overline{GRB}$ of the flow rate $Q_R$ of recirculated gases GRB. That is, the signal indicative of $(1-K)$ is applied from the subtractor 125 to the second multiplier 126 to be multiplied by the signal indicative of the optimum value of the setting $\overline{GFD}$ of the flow rate $Q_R$ of recirculated gases GRB, thereby calculating $\overline{GRB}=(1-K) \cdot \overline{GFD}$. The signal indicative of $(1-K) \cdot \overline{GFD}$ thus calculated in the multiplier 126 is applied to the GRB flow rate regulator 128 as being indicative of the setting for the loop supplying the recirculated gases. The FDB flow rate regulator 127 controls the fluidizing air regulating valve 15 until the feedback value of the flow rate of FDB attains the setting $\overline{FDB}$. The GRB flow rate regulator 28 controls the recirculated gas regulating valve 27 until the feedback value of the flow rate of GRB attains the setting $\overline{GRB}$. In the manner above described, the flow rate $Q_A$ of fluidizing air FDB is controlled to occupy the proportion K, while the flow rate $Q_R$ of recirculated gases GRB is controlled to occupy the proportion $(1-K)$, so that, while maintaining the oxygen concentration at the setting (5%), the flow rate $Q_G$ of fluidizing gas GFD can be maintained at the setting $\overline{GFD}$, and the velocity $U_m$ of fluidizing gas can be maintained constant.

The above description refers to the operation of the apparatus when the individual systems are normally operating. It may be desired to continue the operation of the incinerator 1 even when the recirculated gas supply system fails to properly operate. When, for example, the recirculating blower 26 in the recirculated gas supply system is disabled, and no exhaust gases are now recirculated, the change-over control circuit 107 connected to the output of the recirculated gas flow meter 28 changes over the change-over switch 106 from the contact $S_2$ to another contact $S_1$ thereby rendering the circuit 105 inoperative while permitting continuous operation of the circuit 102. Since the value of $\overline{GFD}$ calculated by the circuit 101 is previously stored in the circuit 102, this data is compared with the data provided by the output signal from the fluidizing gas flow meter 31, and the fluidizing air regulating valve 15 is controlled depending on the difference therebetween until the flow rate $Q_A$ of fluidizing air FDB attains the setting $\overline{GFD}$.

Figure 7:
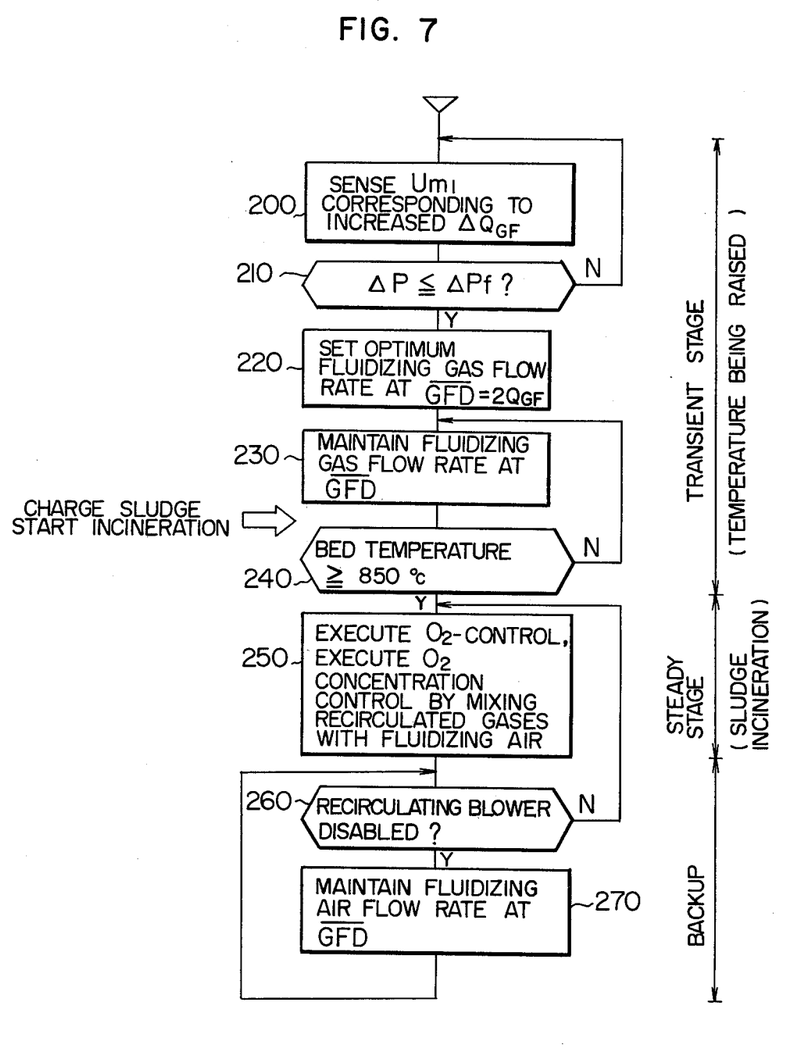
FIG. 7 is a flow chart for illustrating the operation sequence of the apparatus shown in FIG. 1.

FIG. 7 is a flow chart showing the operation sequence of the apparatus of the present invention described in detail hereinbefore. In the starting stage of the incinerator 1, the setting of the flow rate $Q_G$ of fluidizing gas GFD is initially determined as shown in steps 200, 210 and 230. There is the following relation between the fluidizing gas velocity $U_m$ and the flow rate $Q_{GF}$ of fluidizing gas sensed by the flow meter 31:

$$U_m = Q_{GF}/A$$

where A: effective sectional area of the fluidized bed. Therefore, when the fluidization starting gas velocity $U_{m1}$ is found, the setting $\overline{GFD}$ of the flow rate $Q_G$ of fluidizing gas GFD can be calculated to be about two times as large as the flow rate $Q_{GF}$ corresponding to the fluidization starting gas velocity $U_{m1}$.

Further, in steps 200 to 230, atomized auxiliary fuel 9 ignited by the burners 8 is injected toward and into the fluidized bed 6 to progressively raise the internal temperature of the incinerator 1 according to the steam pressure build-up characteristic of the waste heat boiler 20. After the steam pressure has built up to the predetermined level, the intenal temperature of the incinerator 1 is controlled until it attains the level of 850° C. Dehydrated cakes are not charged into the incinerator 1 through the charge opening 10 before the internal temperature attains the above level. Therefore, no $NO_X$ is generated and contained in exhaust gases from the incinerator 1, and fluidizing air only is supplied from the FDB blower 14 through the fluidizing air line 11 to be forcedly fed into the wind box 4 disposed beneath the fluidized bed 6. On the other hand, exhaust gases are sucked by the suction fan 23 to be discharged into the atmosphere through the funnel 18. Since no $O_2$-control is carried out until the internal temperature of the incinerator 1 is raised up to the level above described, a portion of exhaust gases need not be recirculated to be supplied to the fluidized bed 6 in the incinerator 1, and the recirculated gas regulating valve 27 is in its full closed position. When the temperature of the fluidized bed 6 exceeds 850° C. in step 240, completion of temperature rise is confirmed, and, in step 250, sludge in cake form is charged into the incinerator 1 to start incineration. At the same time, $O_2$-control is started in this step 250. If the recirculating blower 26 is disabled during execution of the $O_2$-control, and such a situation is detected in step 260, step 270 is followed in which the flow rate of fluidizing air $\overline{FDB}$ is controlled until it attains the setting $\overline{GFD}$ stored in the circuit 102.

The present invention having the structure and function described in detail hereinbefore provides the following advantages:

(1) The optimum value of the setting of the flow rate of fluidizing gas required for the formation of the fluidized bed can be determined on the basis of the results of automatic measurement and calculation made in the transient stage (the temperature raising stage) for starting the operation of the fluidized-bed incinerator. Therefore, there is no need for fabricating a reduced-scale model of the incinerator.

(2) The optimum value of the setting of the flow rate of fluidizing gas represents a minimum required for successfully achieving the desired incineration, and the $O_2$-control or the flow rate control for maintaining the flow rate of fluidizing gas at the predetermined setting can be executed to achieve the desired incineration. Therefore, the power is not unnecessarily consumed to save the energy required for incineration.

(3) The setting of the flow rate of fluidizing gas is calculated in the preparatory stage (the steps 200 to 230) for starting the operation of the fluidized-bed incinerator, and the fluidizing gas flow rate control and the $O_2$-control are carried out, as soon as the internal temperature of the incinerator is raised up to the predetermined level and incineration is started. Therefore, incineration can proceed under the conditions in which the fluidized bed is thermally stabilized and the content of $NO_X$ in exhaust gases is reduced.

(4) Even if the recirculating blower is disabled during execution of the $O_2$-control, the flow rate of fluidizing air can be controlled so as to supply fluidizing gas with the predetermined flow rate. Therefore, the fluidized bed can be kept thermally stable throughout the process of incineration, thereby enhancing the reliability of the whole plant.

I claim:

1. A fluidizing gas control apparatus for a fluidized-bed incinerator comprising:
    a fluidized-bed incinerator igniting an object to be incinerated under formation of a fluidized-bed of a fluid-forming medium;
    fluidizing air supplying means for supplying fluidizing air furnishing oxygen required for combustion and assisting in the formation of said fluidized bed by the fluid-forming medium in said fluidized-bed incinerator;
    gas recirculating means for recirculating a portion of exhaust gases discharged from said fluidized-bed incinerator;
    first means for determining the optimum value of the flow rate of fluidizing gas on the basis of a variation of the pressure loss of the fluidizing air flowing across said bed formed by the fluid-forming medium, while progressively increasing the flow rate of the fluidizing air supplied by said fluidizing air supplying means to said fluidized-bed incinerator in the combustion starting stage of said fluidized-bed incinerator; and
    second means for controlling said fluidizing air supplying means and said gas recirculating means so that the sum of the flow rate of the fluidizing air supplied by said fluidizing air supplying means and the flow rate of the recirculated gases recirculated by said gas recirculating means attains said optimum value of the fluidizing gas flow rate.

2. An apparatus as claimed in claim 1, wherein said second means includes means for sensing the concentration of oxygen contained in the exhaust gases, and means for comparing the sensed oxygen concentration with a predetermined oxygen concentration setting thereby determining the ratio between the flow rate of the fluidizing air and the flow rate of the recirculated gases on the basis of the concentration difference.

3. An apparatus as claimed in claim 2, wherein said second means further includes means for determining the flow rate of the fluidizing air and the flow rate of the recirculated gases on the basis of said determined ratio between the fluidizing air flow rate and the recirculated gas flow rate and said optimum value of the fluidizing gas flow rate, respectively.

4. An apparatus as claimed in claim 1, further comprising means for controlling said fluidizing air supplying means in the event that said gas recirculating means is disabled, so that the flow rate of the fluidizing air supplied by said fluidizing air supplying means attains said optimum value of the fluidizing gas flow rate.

5. A fluidizing gas control apparatus for a fluidized-bed incinerator comprising:
- a fluidized-bed incinerator igniting an object to be incinerated under formation of a fluidized bed of a fluid-forming medium;
- fluidizing air supplying means for supplying fluidizing air furnishing oxygen required for combustion and assisting in the formation of said fluidized bed by the fluid-forming medium in said fluidized-bed incinerator;
- gas recirculating means for recirculating a portion of exhaust gases discharged from said fluidized-bed incinerator;
- means for determining the optimum value of the flow rate of fluidizing gas on the basis of a variation of the pressure loss of the fluidizing air flowing across said bed formed by the fluid-forming medium, while progressively increasing the flow rate of the fluidizing air supplied by said fluidizing air supplying means to said fluidized-bed incinerator in the combustion starting stage of said fluidized-bed incinerator in which the object to be incinerated is not still charged into said incinerator and said gas recirculating means is not placed in operation;
- first means for controlling said fluidizing air supplying means so that the flow rate of the fluidizing air attains said optimum value of the fluidizing gas flow rate;
- second means for controlling said fluidizing air supplying means and said gas recirculating means so that the sum of the flow rate of the fluidizing air and the flow rate of the recirculated gases attains said optimum value of the fluidizing gas flow rate; and
- change-over means for enabling said second means and disenabling said first means under the normal operating condition of said apparatus, while, on the other hand, disenabling said second means and enabling said first means in the event that said gas recirculating means is disabled.

6. An apparatus as claimed in claim 5, wherein said second means includes means for sensing the concentration of oxygen contained in the exhaust gases, and means for comparing the sensed oxygen concentration with a predetermined oxygen concentration setting thereby determining the ratio between the flow rate of the fluidizing air and the flow rate of the recirculated gases on the basis of the concentration difference.

7. An apparatus as claimed in claim 6, wherein said second means further includes means for determining the flow rate of the fluidizing air and the flow rate of the recirculated gases on the basis of said determined ratio between the fluidizing air flow rate and the recirculated gas flow rate and said optimum value of the fluidizing gas flow rate, respectively.

* * * * *